(12) United States Patent
Chao

(10) Patent No.: US 12,457,307 B2
(45) Date of Patent: Oct. 28, 2025

(54) WIRELESS FISHING MONITOR

(71) Applicant: LIANHONG ART CO., LTD., Taoyuan (TW)

(72) Inventor: Po-Tsun Chao, Taoyuan (TW)

(73) Assignee: LIANHONG ART CO., LTD., Taoyuan (TW)

( * ) Notice: Subject to any disclaimer, the term of this patent is extended or adjusted under 35 U.S.C. 154(b) by 32 days.

(21) Appl. No.: 18/592,598

(22) Filed: Mar. 1, 2024

(65) Prior Publication Data
US 2024/0305749 A1  Sep. 12, 2024

(30) Foreign Application Priority Data
Mar. 9, 2023 (TW) .................. 112108786

(51) Int. Cl.
*H04N 7/18* (2006.01)
*A01K 91/06* (2006.01)
*A01K 97/12* (2006.01)
*H04N 23/51* (2023.01)
*H04N 23/52* (2023.01)
*H04N 23/57* (2023.01)

(52) U.S. Cl.
CPC ............. *H04N 7/183* (2013.01); *A01K 91/06* (2013.01); *A01K 97/125* (2013.01); *H04N 23/51* (2023.01); *H04N 23/52* (2023.01); *H04N 23/57* (2023.01)

(58) Field of Classification Search
CPC ........ H04N 7/183; H04N 23/51; H04N 23/52; H04N 23/57; A01K 91/06; A01K 97/125
USPC .......................................... 348/81
See application file for complete search history.

(56) References Cited

U.S. PATENT DOCUMENTS 11,298,835 B2 * 4/2022 Kim ................. B25J 19/026
2005/0162976 A1 * 7/2005 Kuriyama ............ A01K 89/00
367/111

(Continued)

FOREIGN PATENT DOCUMENTS

CN   102948405 A   3/2013
CN   202794801 U   3/2013

(Continued)

OTHER PUBLICATIONS

Office Action dated Jul. 11, 2023 of the corresponding Taiwan patent application No. 112108786; PCT International Search Report dated Nov. 9, 2023 of the corresponding PCT patent application No. PCT/CN2023/084346.

*Primary Examiner* — Matthew David Kim
(74) *Attorney, Agent, or Firm* — HDLS IPR SERVICES; Chun-Ming Shih

(57) ABSTRACT

A wireless fishing monitor includes a monitor module, a control circuit, a power supply unit, a tube, a front cover, and an antenna cover. The control circuit is electrically connected to the monitor module, the control circuit at least includes a first circuit board, a second circuit board, and an antenna. The power supply unit is located on one side of the second circuit board and is electrically connected to the second circuit board. The tube includes a cylinder body with a hollow cylindrical shape, the cylinder body is configured to install the monitor module and the control circuit. The front cover is connected to the front joint of the front opening to cover the monitor module. The antenna cover is fixedly connected to the rear joint on the rear opening of the cylinder body.

18 Claims, 8 Drawing Sheets

(56) References Cited

U.S. PATENT DOCUMENTS

| | | | | |
|---|---|---|---|---|
| 2016/0178993 A1* | 6/2016 | Bianciardi | ............ | A01K 91/06 |
| | | | | 348/81 |
| 2016/0219855 A1* | 8/2016 | Turner | ................ | A01K 97/125 |
| 2017/0079257 A1* | 3/2017 | Haensgen | ............ | H04W 76/14 |
| 2017/0179599 A1* | 6/2017 | Bevelacqua | ........... | H01Q 5/364 |
| 2018/0142500 A1* | 5/2018 | Shintani | ................. | E05B 41/00 |
| 2018/0192624 A1* | 7/2018 | Chen | ..................... | A01K 85/16 |
| 2020/0375167 A1* | 12/2020 | West | ...................... | A01K 97/01 |
| 2021/0054729 A1* | 2/2021 | Ren | ....................... | E21B 47/017 |
| 2021/0100235 A1* | 4/2021 | Ferger | ................... | A01K 97/00 |
| 2023/0156107 A1* | 5/2023 | Park | ...................... | H05K 1/189 |
| | | | | 361/679.01 |

FOREIGN PATENT DOCUMENTS

| | | | |
|---|---|---|---|
| CN | 203233924 U | * | 10/2013 |
| CN | 205195833 U | | 4/2016 |
| CN | 206470519 U | | 9/2017 |
| TW | M270667 U | | 7/2005 |
| TW | M395356 U | | 1/2011 |
| TW | M645537 U | | 9/2023 |

* cited by examiner

WIRELESS FISHING MONITOR

BACKGROUND OF THE DISCLOSURE

Technical Field

The present disclosure relates to fishing equipment, particularly relates to a wireless fishing monitor that may float on the water for fishing and monitor fish schools and fishing status under the water.

Description of Related Art

Fishing is a method that uses a fishing line to pull a fishhook hung with bait to lure fish. The most common fishing method is rod fishing, which uses a fishing rod stretched above the water to control the fishing line. It is a very popular leisure outdoor sport.

When fishing, the status of fish schools eating bait or taking the bait is known through the signal of the buoy on the main line bobbing on the water surface or being pulled and sinking into the water. When the buoy bobs fiercely on the water surface means that the fish schools under the water are eating the bait. If the buoy does not bob for a long time, anglers may only say that there are no fish schools eating the bait, or the bait is decoupled, or the bait is not dropped into the water at a depth where the fish schools are swimming. These issues only be understood by experienced anglers and are not understood by beginner anglers.

Therefore, some anglers may buy a monitor, connect one end of the monitor to a mobile device, and then throw the monitor into the water to monitor the status of fish schools. Due to this monitoring method, the camera thrown into the water is far away from the bait, and the water is turbid, making anglers difficult to see the fish schools eating the bait.

Therefore, how to know the status of fish schools eating bait or bait decoupling when fishing is a problem to be solved by the present disclosure.

SUMMARY OF THE DISCLOSURE

Therefore, the main purpose of the present disclosure is to solve the above problem. The present disclosure provides a wireless fishing monitor, and the wireless fishing monitor is tied to the fishing line. After the fishing line is thrown into the water, the wireless fishing monitor immediately floats on the water, and the audio and video signals of the fish eating the bait below the wireless fishing monitor may be captured so that anglers may understand the status of fish schools eating bait.

To achieve the above purpose, the present disclosure provides a wireless fishing monitor including: a monitor module, a control circuit, a power supply unit, a tube, a front cover, and an antenna cover. The control circuit is electrically connected to the monitor module, at least includes a first circuit board, a second circuit board, and an antenna, the first circuit board is electrically connected to the second circuit board, and the antenna is electrically connected to the second circuit board. The power supply unit is located on one side of the second circuit board and electrically connected to the second circuit board. The tube includes a cylinder body in a hollow cylindrical shape, the cylinder body includes a front opening and a rear opening, the cylinder body includes a front joint and a rear joint both in a threaded shape and disposed on an outer surface thereof, the monitor module and the control circuit are installed in the cylinder body. The front cover is connected to the front joint on the front opening to cover the monitor module. The antenna cover is fixedly connected to the rear joint on the rear opening of the cylinder body and includes an electrode connector, one end of the electrode connector electrically connected to the power supply unit, and another end of the electrode connector electrically connected to the second circuit board, the power supply unit provides electricity to the monitor module and the control circuit.

In one embodiment of the present disclosure, the monitor module includes an image-capturing camera, a supplementary light circuit board, and an adapter circuit board. The image-capturing camera and the supplementary light circuit board are electrically connected to the adapter circuit board, and the adapter circuit board is electrically connected, by a cable, to the control circuit and the power supply unit.

In one embodiment of the present disclosure, the supplementary light circuit board is disposed around the image-capturing camera, the supplementary light circuit board includes a plurality of light-emitting diodes (LEDs).

In one embodiment of the present disclosure, the image-capturing camera is a CCD camera or a CMOS camera.

In one embodiment of the present disclosure, the first circuit board includes a signal processing circuit or a charging circuit and further includes a first connector, a power switch, and an indicator light.

In one embodiment of the present disclosure, the indicator light includes a plurality of LEDs.

In one embodiment of the present disclosure, the second circuit board is electrically connected, by the cable, to the adapter circuit board to receive a signal from the monitor module, and the second circuit board includes a negative electrode and a positive electrode disposed on one end thereof, and the negative electrode is electrically connected to a negative pole of the power supply unit.

In one embodiment of the present disclosure, the second circuit board includes a signal processing circuit and a wireless signal transmitting circuit and further includes a second connector.

In one embodiment of the present disclosure, the first connector and the second connector are a micro USB connector, a mini USB connector, or a USB TYPE C connector, respectively.

In one embodiment of the present disclosure, the power supply unit includes the negative pole and a positive pole, the negative pole is electrically connected to the negative electrode of the second circuit board to provide electricity to the control circuit and the monitor module.

In one embodiment of the present disclosure, the power supply unit is a disposable battery or a rechargeable battery.

In one embodiment of the present disclosure, the cylinder body includes at least one threading loop convexly disposed on an outer surface thereof between the front joint and the rear joint, the threading loop includes at least one perforation, a fixture is disposed in the perforation, the fixture includes two elastic sheets, two clamping mouths are connected to the two elastic sheets, and when the two elastic sheets are pressed inward, the two clamping mouths are opened.

In one embodiment of the present disclosure, the control circuit further includes a support plate fixedly connected to the first circuit board, and the support plate includes a keyhole.

In one embodiment of the present disclosure, the cylinder body includes two ribs disposed on an inner wall thereof, the two ribs are used to fix the control circuit, and each of the two ribs includes a locking hole defined on a front end thereof, and the locking hole is used to lock a support frame.

In one embodiment of the present disclosure, the cylinder body includes a waterproof cover, a power button, and a display window disposed on the outer surface thereof, the control circuit is disposed inside of the cylinder body, the waterproof cover is disposed corresponding to the first connector, the power button is disposed corresponding to the power switch, and the display window is disposed corresponding to the indicator light.

In one embodiment of the present disclosure, the wireless fishing monitor further includes the support frame, the support frame includes a fixing plate, the fixing plate includes a plurality of through holes, the through holes are used for a screw to pass through to make the fixing plate be locked in the keyhole of the support plate and the locking hole of the rib of the cylinder body to fix the control circuit, the fixing plate includes a passage, the passage is used for the antenna to pass through.

In one embodiment of the present disclosure, the front cover includes an open end and a closed end, the open end includes an inner joint in the threaded shape, the inner joint, and the cylinder body are connected to the front joint, and the closed end includes a transparent window.

In one embodiment of the present disclosure, the antenna cover includes a float and a locking element adapted to sheathe the float, the float includes a flange part disposed at an opening thereof, and the flange part is connected with the rear opening of the cylinder body, the float includes a plurality of convex ribs in different shapes disposed inside, the electrode connector is fixedly connected to one of the convex ribs, one end of the electrode connector is electrically connected to the positive pole of the power supply unit, another end of the electrode connector is electrically connected to the positive electrode of the second circuit board to transmit the electric power to the first circuit board and the monitor module through the second circuit board.

In one embodiment of the present disclosure, the locking element includes an opening portion defined on one end thereof and a constriction portion disposed on another end thereof, the opening portion includes an inner joint in the threaded shape, and the inner joint is connected with the rear joint of the cylinder body, the constriction portion of the locking element presses the flange part to be connected with the rear opening of the cylinder body.

In one embodiment of the present disclosure, two waterproof washers are respectively disposed around the front opening and the rear opening of the cylinder body.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
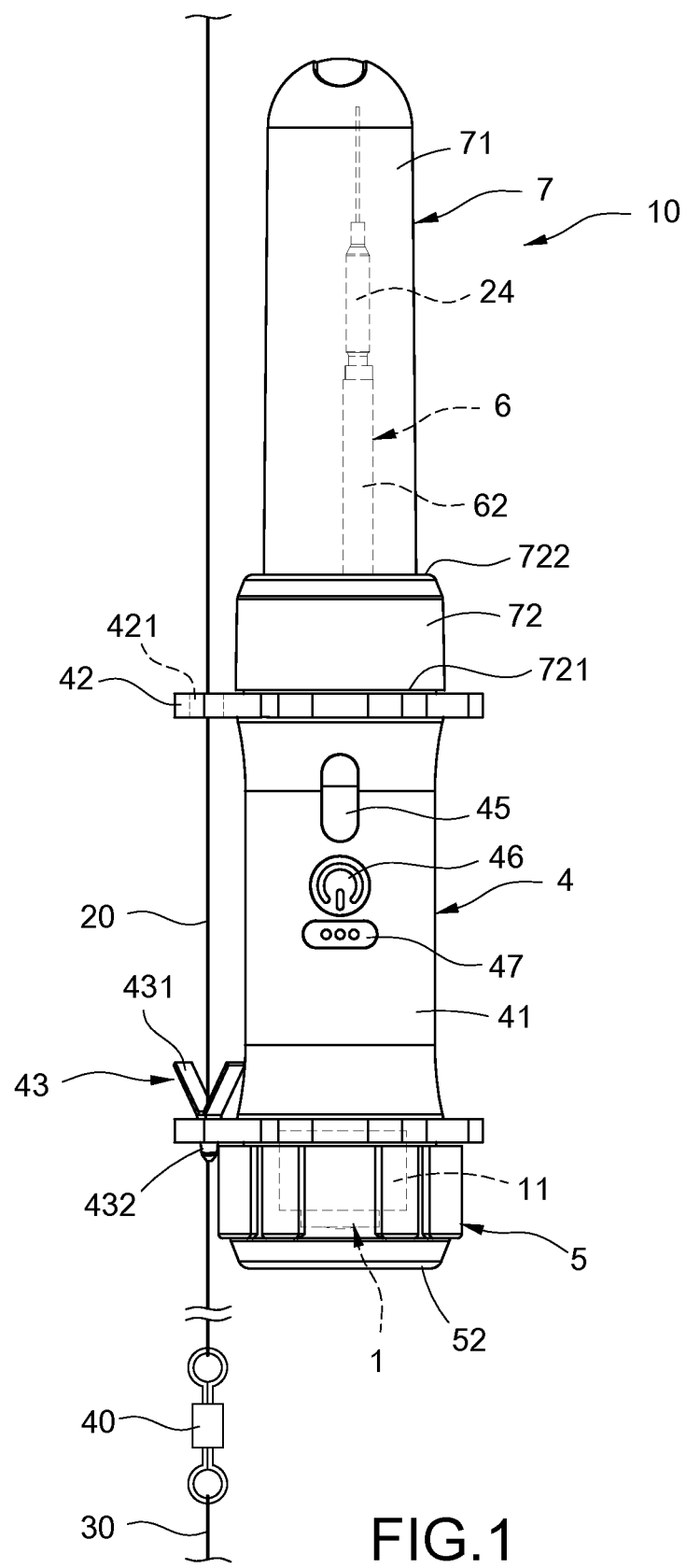
FIG. 1 is a schematic diagram of the appearance of the wireless fishing monitor in accordance with the present disclosure.
Figure 2:
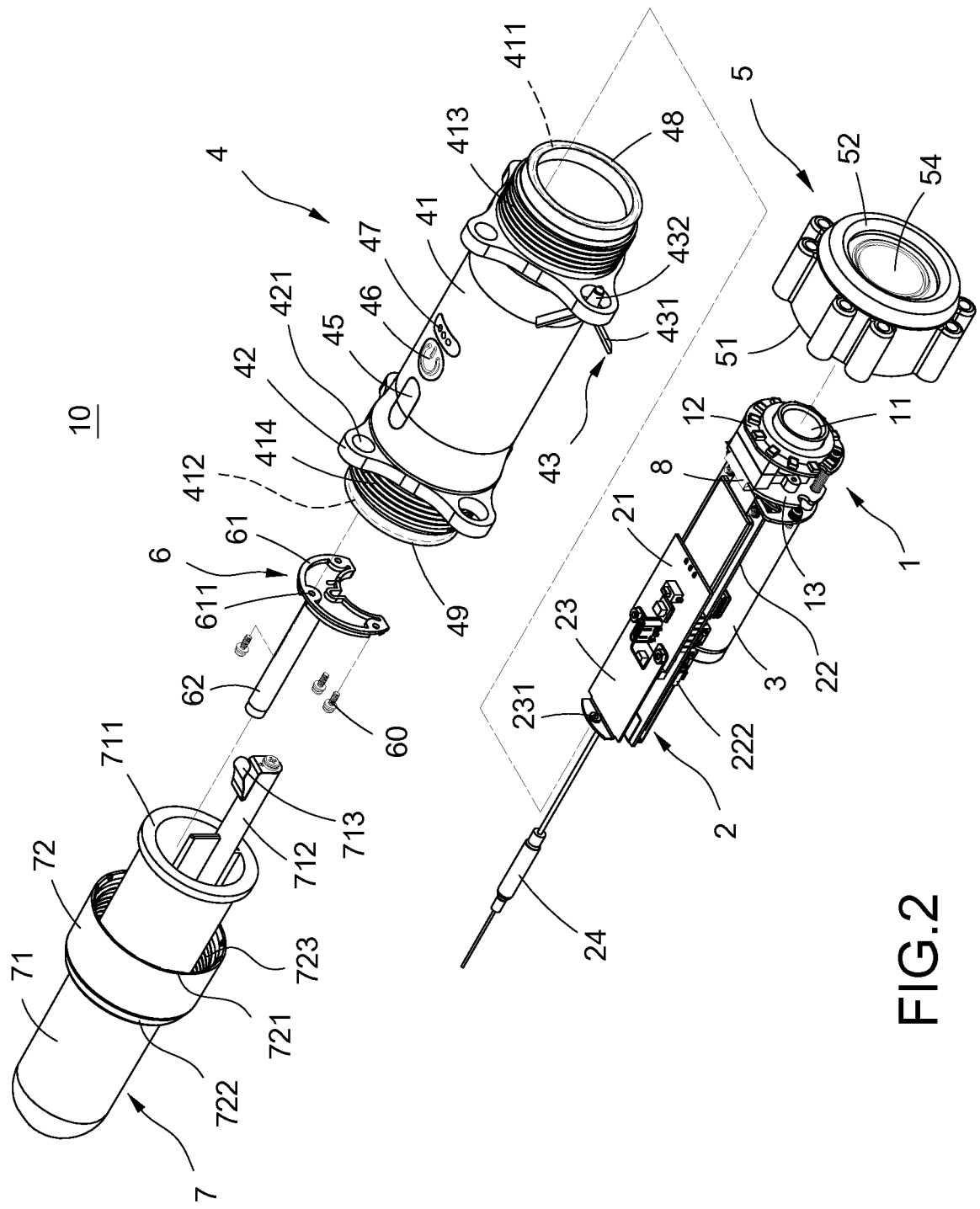
FIG. 2 is a structurally exploded diagram of the wireless fishing monitor of FIG. 1.
Figure 3:
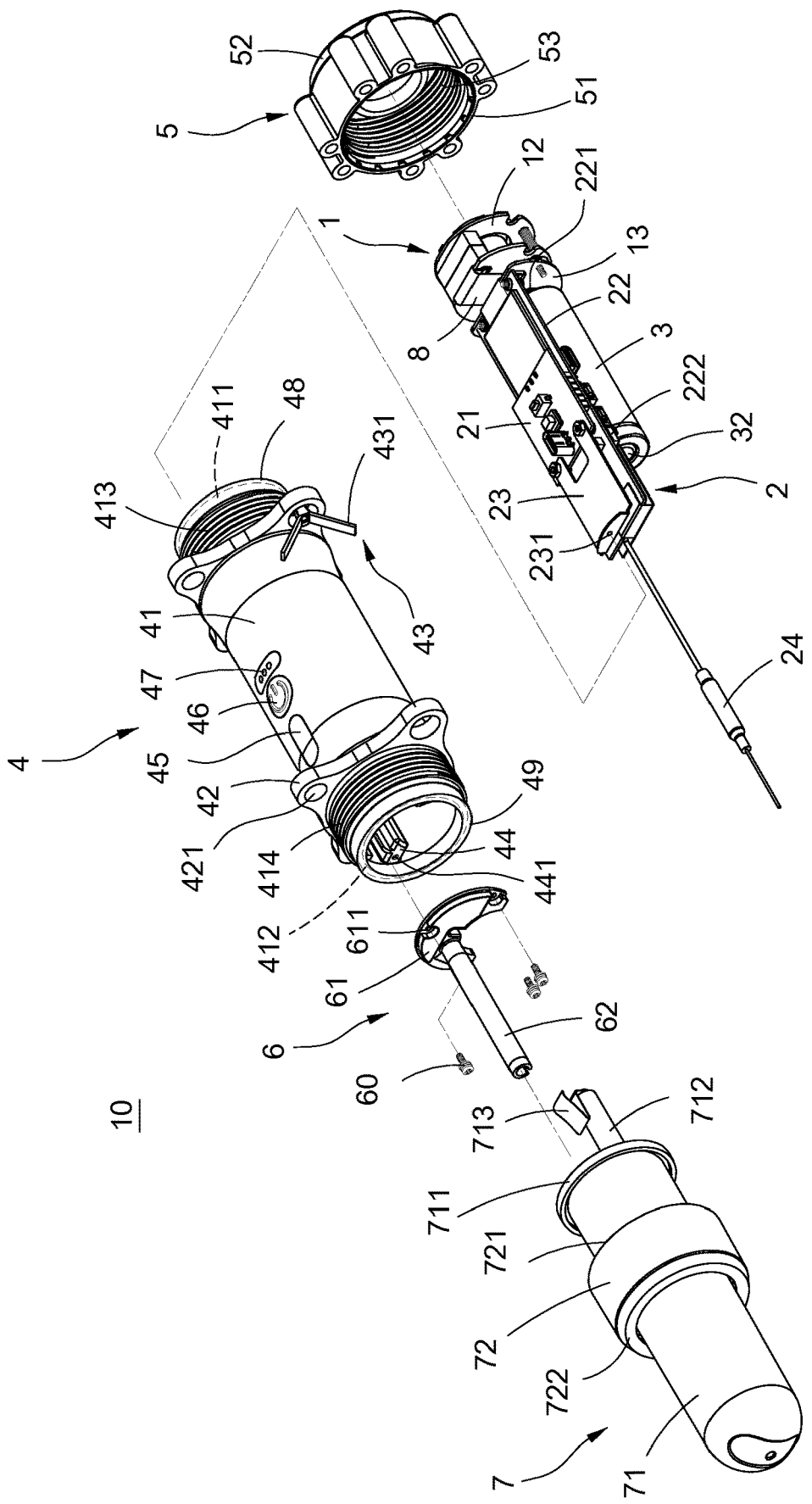
FIG. 3 is a structurally exploded diagram of the wireless fishing monitor of FIG. 2 from another perspective.
Figure 4:
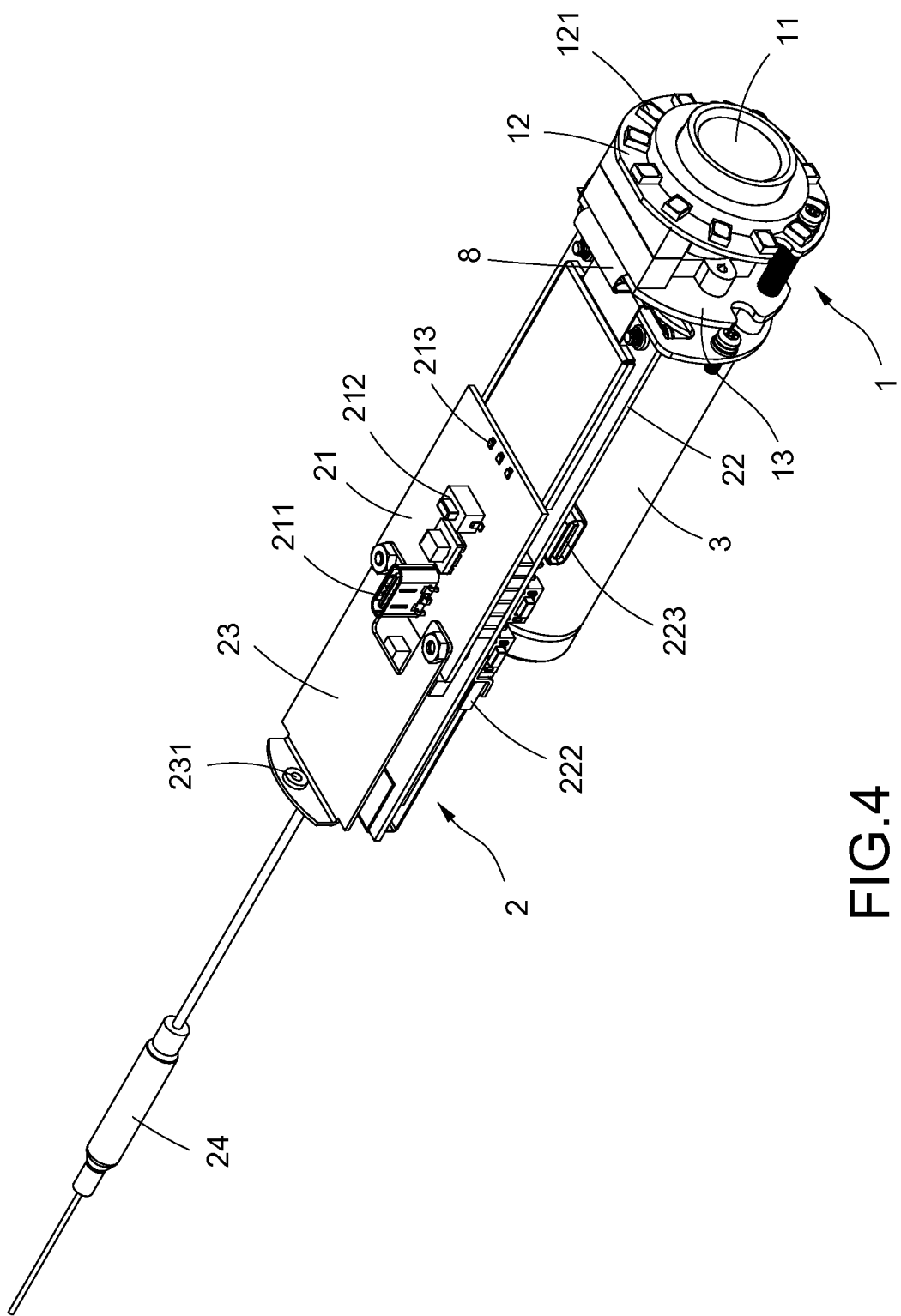
FIG. 4 is a schematic diagram of the control circuit of FIG. 2.

FIG. 1 is a schematic diagram of the appearance of the wireless fishing monitor in accordance with the present disclosure, FIG. 2 is a structurally exploded diagram of the wireless fishing monitor of FIG. 1, FIG. 3 is the structurally exploded diagram of the wireless fishing monitor of FIG. 2 from another perspective, and FIG. 4 is a schematic diagram of the control circuit of FIG. 2. As shown in the FIGs, the wireless fishing monitor 10 of the present disclosure includes a monitor module 1, a control circuit 2, a power supply unit 3, a tube 4, a front cover 5, a support frame 6, and an antenna cover 7. The main line 20 and the leader 30 are disposed on the tube 4 to pass through the threading loop 42, and a swivel 40 is connected between the main line 20 and the leader 30, the swivel 40 may prevent the main line 20 from detaching from the wireless fishing monitor 10. After the leader 30 hooks the bait (not shown in figures), and the bait falls into the water, the monitor module 1 is used to monitor the fishing conditions under the water and transmit the captured video and audio to the receiving device 50 (such as FIG. 8) on the receiving end to provide the user to watch the fish schools eating bait status under the water surface.

The monitor module 1 includes an image-capturing camera 11, a supplementary light circuit board 12, and an adapter circuit board 13, the image-capturing camera 11 and the supplementary light circuit board 12 are electrically connected to the adapter circuit board 13, and the adapter circuit board 13 is electrically connected, to the control circuit 2 and the power supply unit 3, by a cable 8. The image-capturing camera 11 is used for capturing fishing conditions underwater, and the captured audio and video signals are transmitted to the control circuit 2 through the adapter circuit board 13 for processing. The processing result is passed to the receiving device 50 (such as FIG. 8) of the receiving end by the control circuit 2 to allow the user to watch the fish schools eating bait status under the water surface. The supplementary light circuit board 12 is disposed around the image-capturing camera 11, the supplementary light circuit board 12 includes a plurality of LEDs 121. The light sources generated by these LEDs 121 allow fishing activities to continue at night. In this FIG, the image-capturing camera 11 is a CCD camera or a CMOS camera.

Figure 5:
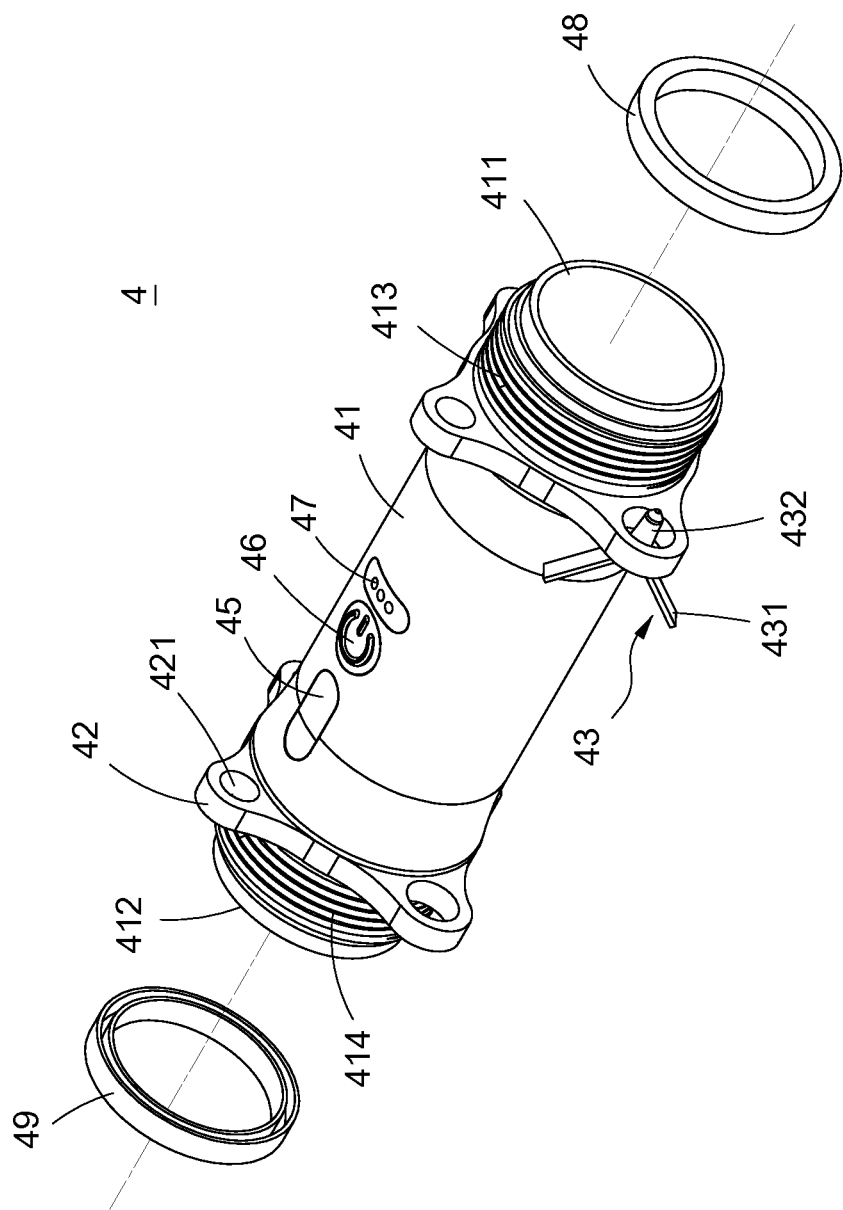
FIG. 5 is an exploded diagram of the tube and the waterproof washer of the wireless fishing monitor in accordance with the present disclosure.

A control circuit 2 includes a first circuit board 21, a second circuit board 22, a support plate 23, and an antenna 24. The first circuit board 21 is electrically connected to the second circuit board 22. The first circuit board 21 includes a signal processing circuit (not shown in figures) or a charging circuit (not shown in figures), and further includes a first connector 211, a power switch 212, and an indicator light 213. The first connector 211 provides a plug-in port to charge the power supply unit 3 or is externally connected to the receiving device 50 (such as FIG. 8) for data update or signal transmission. The power switch 212 is used to activate the power supply for the wireless fishing monitor 10. The indicator light 213 includes a plurality of LEDs 121 to display the charging and working status of the wireless fishing monitor 10 or the power supply status of the power supply unit 3. The second circuit board 22 is electrically connected, by the cable 8, to the adapter circuit board 13 to receive a signal from the monitor module 1, and the second circuit board 22 includes a negative electrode 221 disposed on one end thereof, and a positive electrode 222 (as shown in FIG. 5), and the negative electrode 221 is electrically connected to a negative pole 31 of the power supply unit 3. The second circuit board 22 includes a signal processing circuit (not shown in figures) and a wireless signal transmitting circuit (not shown in figures) and further includes a second connector 223. After the wireless fishing monitor 10 is disassembled, the second connector 223 may be plugged with the transmission line to be connected externally to the external receiving device 50 (such as FIG. 8) for data updating or signal transmission. The support plate 23 is fixedly connected to the first circuit board 21, and the support plate 23 includes a keyhole 231 to lock the support frame 6. The antenna 24 is electrically connected to the second circuit board 22, processes the audio and video signals transmitted from the monitor module 1, and then transmits the processing result through the wireless transmitting circuit and the antenna 24 to the receiving device 50 (such as FIG. 8) of the receiving end to allow the user to watch the fish schools eating bait status under the water surface. In this FIG, the first connector 211, and the second connector 223 are a micro USB connector, a mini USB connector, or a USB TYPE C connector, respectively.

A power supply unit 3 is located on one side of the second circuit board 22. The power supply unit 3 includes the negative pole 31 and a positive pole 32, the negative pole 31 is electrically connected to the negative electrode 221 of the second circuit board 22 to provide the required electricity to the control circuit 2 and the monitor module 1. In this FIG, the power supply unit 3 may be a disposable battery or a rechargeable battery.

A tube 4 includes a cylinder body 41 in a hollow cylindrical shape, and the cylinder body 41 includes a front opening 411 and a rear opening 412. The cylinder body 41 closed to the front opening 411 and the rear opening 412 includes a front joint 413 and a rear joint 414 both in a threaded shape and disposed on an outer surface thereof. The front joint 413 is connected with the front cover 5, and the rear joint 414 is connected with the antenna cover 7. The cylinder body 41 includes at least one threading loop 42 convexly disposed on an outer surface thereof between the front joint 413 and the rear joint 414, the threading loop 42 includes at least one perforation 421, a fixture 43 is disposed in the perforation 421, the fixture 43 includes two elastic sheets 431, two clamping mouths 432 are connected to the two elastic sheets 431, and when the two elastic sheets 431 are pressed inward, the two clamping mouths 432 are opened and may be pulled to adjust the depth of the main line 20 falling under the water surface. After adjustment, releasing the two elastic sheets 431 makes the two clamping mouths 432 clamp the main line 20, and when the wireless fishing monitor 10 floats on the water, makes the leader 30 and the bait fall just below the water surface for the desirable fishing position (where fish schools swim). The cylinder body 41 includes two ribs 44 disposed on an inner wall thereof, the two ribs 44 are used to fix the control circuit 2, and each of the two ribs 44 includes a locking hole 441 defined on a front end thereof, and the locking hole 441 is used to lock a support frame 6. The cylinder body 41 includes a waterproof cover 45, a power button 46, and a display window 47 disposed on the outer surface thereof, the control circuit 2 is disposed inside of the cylinder body 41, the waterproof cover 45 is disposed corresponding to the first connector 211, the power button 46 is disposed corresponding to the power switch 212, and the display window 47 is disposed corresponding to the indicator light 213. After the waterproof cover 45 is opened, the first connector 211 is exposed for plugging the external transmission line. The power button 46 is pushed to press the power switch 212 to boot up the wireless fishing monitor 10, at the same time, the indicator light 213 is lit up and displayed by the display window 47 to display the usage status or power supply status of the wireless fishing monitor 10, etc.

The front cover 5 includes an open end 51 and a closed end 52, the open end 51 includes an inner joint 53 in the threaded shape, the inner joint 53 and the cylinder body 41 are connected to the front joint 413, the closed end 52 includes a transparent window 54. The transparent window 54 is used for the image-capturing camera 11 to capture the audio and video signals of fish schools eating the bait, when fishing at night, the light source generated by the LED 121 of the supplementary light circuit board 12 may be output by the transparent window 54 to allow the angler to watch the fish schools eating bait status under the water surface.

The support frame 6 includes a fixing plate 61, the fixing plate 61 includes a plurality of through holes 611, the through holes 611 are used for a screw 60 to pass through to make the fixing plate 61 be locked in the keyhole 231 of the support plate 23 and the locking hole 441 of the rib 44 of the cylinder body 41 to fix the control circuit 2, the fixing plate 61 includes a passage, the passage is used for the antenna 24 to pass through to prevent the antenna 24 from being damaged by external forces during installation.

The antenna cover 7 includes a float 71 and a locking element 72 adapted to sheathe the float 71, the float 71 includes a flange part 711 disposed at an opening thereof, and the flange part 711 is connected with the rear opening 412 of the cylinder body 41, the float 71 includes a plurality of convex ribs 712 in different shapes disposed inside, the electrode connector 713 is fixedly connected to one of the convex ribs 712. When the float 71 is combined with the cylinder body 41, one end of the electrode connector 713 is electrically connected to the positive pole 32 of the power supply unit 3, and another end of the electrode connector 713 is electrically connected to the positive electrode 222 of the second circuit board 22 to transmit the electric power to the first circuit board 21 and the monitor module 1 through the second circuit board 22. The locking element 72 includes an opening portion 721 defined on one end thereof and a constriction portion 722 disposed on another end thereof, the opening portion 721 includes an inner joint 723 in the threaded shape, and the inner joint 723 is connected with the rear joint 414 of the cylinder body 41, the constriction portion 722 of the locking element 72 presses the flange part 711 to be connected with the rear opening 412 of the cylinder body 41.

Figure 6:
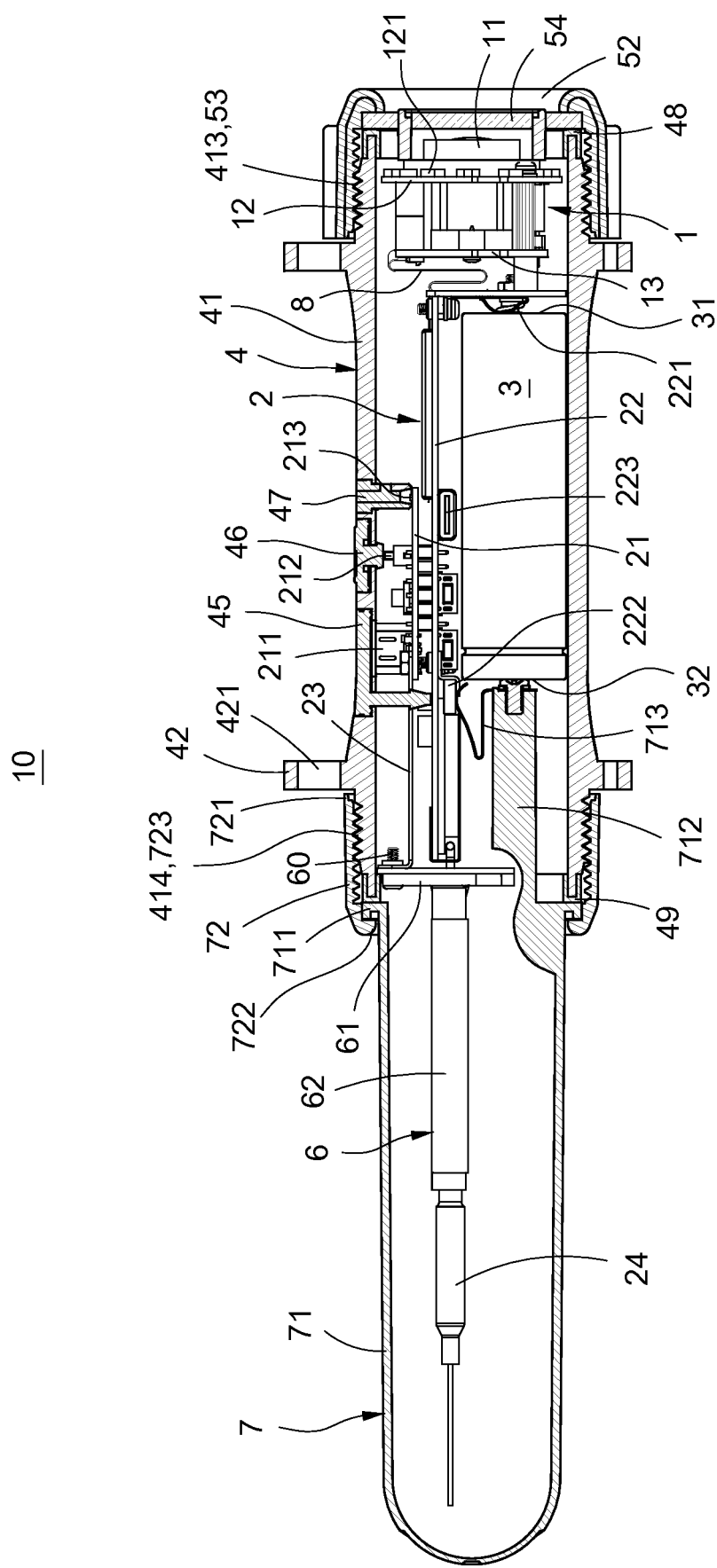
FIG. 6 is a side cross-section diagram of the wireless fishing monitor in accordance with the present disclosure.

Please refer to FIG. 5 and FIG. 6, which are an exploded diagram of the tube and the waterproof washer of the wireless fishing monitor and a side cross-section diagram of the wireless fishing monitor in accordance with the present disclosure. As shown in the FIGs, after the monitor module 1, the control circuit 2, the power supply unit 3, and the support frame 6 of the present disclosure are assembled inside the tube 4, two waterproof washers 48, 49 are respectively disposed around the front opening 411 and the rear opening 412 of the cylinder body 41 of tube 4. When the cylinder body 41 is assembled with the front cover 5 and the antenna cover 7, the waterproof washers 48, 49 may prevent water from penetrating into the cylinder body 41, allowing the wireless fishing monitor 10 to have a waterproof function.

Figure 7:
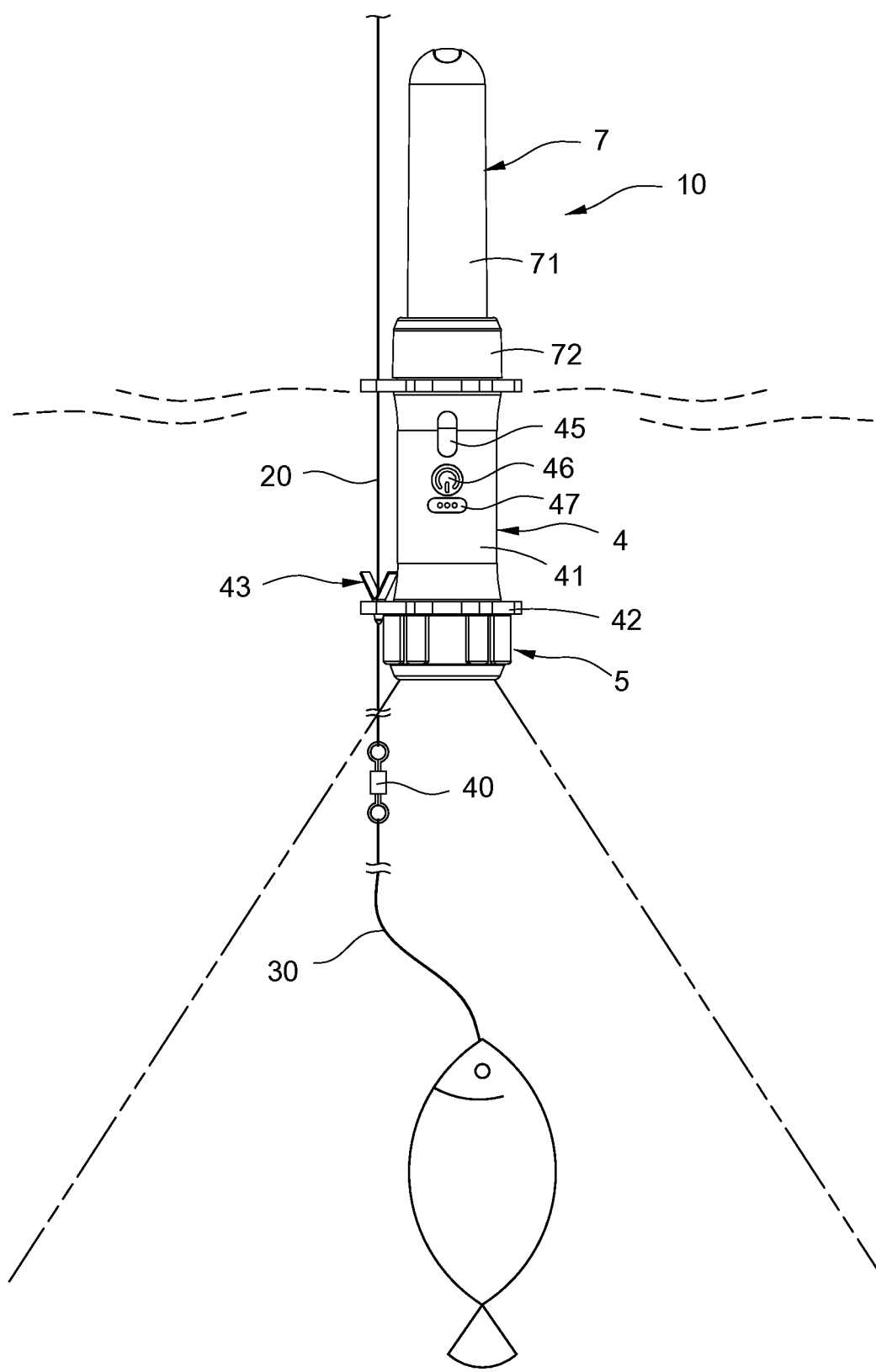
FIG. 7 is a schematic diagram of using status of the wireless fishing monitor in accordance with the present disclosure.

Please refer to FIG. 7, which is a schematic diagram of using status of the wireless fishing monitor in accordance with the present disclosure. As shown in the FIG, when the wireless fishing monitor 10 of the present disclosure is in use, the main line 20 passes through the perforation 421 and the fixture 43 of the two threading loops 42; the swivel 40 ties on one end of the main line 20 that passes through the two perforations 421; the leader 30 ties on one end of the swivel 40. When the fixture 43 is pressed to make the two clamping mouths 432 open, the depth of the main line 20 falling into the water may be adjusted by pulling the main line 20, and after adjustment, the two elastic sheets 431 may be released to make the two clamping mouths 432 clamp the main line 20.

After the fishhook on the leader 30 is hooked to the bait and thrown into the water, the wireless fishing monitor 10 floats on the water like the previous buoy. At this time, using the monitor module 1 to monitor the fishing status under the water and transmit the captured video and audio to the receiving device 50 (such as FIG. 8) on the receiving end, to allow the user to watch the fish schools eating bait status under the water surface.

When a fish is caught, or when the fishhook hooks on a stone or a heavy object and is broken off, the swivel 40 may prevent the main line 20 from being separated from the wireless fishing monitor 10. The wireless fishing monitor 10 may be pulled back through the main line 20. The leader 30 and the fishhook may be re-tied to the swivel 40 (not shown in figures).

Figure 8:
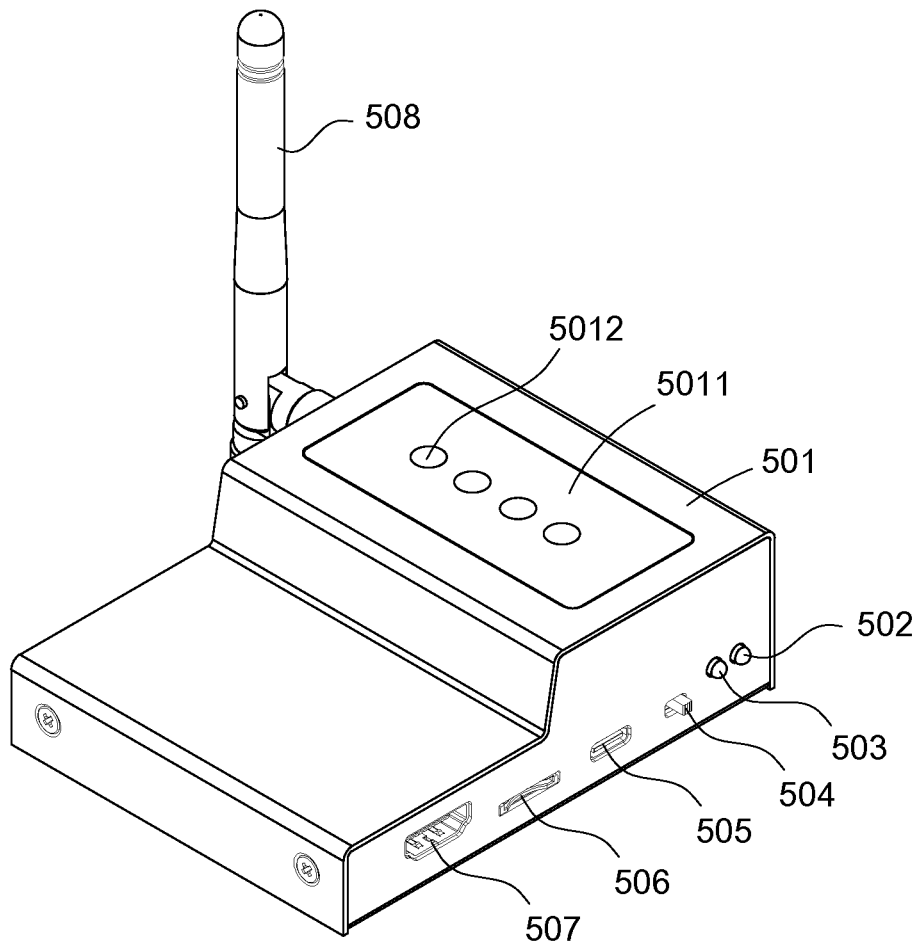
FIG. 8 is a schematic diagram of the receiving device connected with the wireless fishing monitor in accordance with the present disclosure.

FIG. 8 is a schematic diagram of the receiving device connected with the wireless fishing monitor in accordance with the present disclosure. As shown in the figure, the wireless fishing monitor 10 of the present disclosure may be externally connected to the receiving device 50. The receiving device 50 includes a case 501, and the case 501 is equipped with an internal circuit board (not shown in figures), the internal circuit is electrically connected to a first indicator light 502, a second indicator light 503, a power switch 504, a USB Type C connector 505, a memory card slot 506, a HDMI connector 507, and a receive antenna 508 all exposed outside the case 501.

The case 501 includes a touchpad 5011, and the touchpad 5011 includes a plurality of patterns of the touch keys 5012. The user may operate on the receiving device 50 according to the touch keys 5012. In this FIG, the touch keys 5012 are respectively the function of the 4-stage magnification photographic screen, the function of adjusting the 4-stage supplementary light brightness, the function of switching to photography, and the function of photo-taking.

The first indicator light 502, after the power switch 504 is turned on, the first indicator light 502 is lit to show that the receiving device 50 is on. In this FIG, the first indicator light 502 is the LED.

The second indicator light 503, after the receiving device 50 is turned on, the second indicator light 503 is lit when the receiving device 50 is wirelessly connected to the wireless fishing monitor 10. In this FIG, the first indicator light 502 is the LED.

The power switch 504, after pulling the power switch 504, the circuit board lights up the first indicator light 502 to indicate that the receiving device 50 is powered on.

The USB Type C connector 505 is used to plug into the USB Type C transmission line (not shown in figures) to electrically connect an external mobile device (not shown in figures) may monitor the images captured by the wireless fishing monitor 10. In this diagram, the mobile device is a mobile phone, tablet, television, or laptop.

The memory card slot 506 is used to insert a memory card to store images or photos taken by the wireless fishing monitor 10 or to store updated data or software programs of the receiving device 50. In this diagram, the memory card slot 506 is Micro SD, Micro SD, or Micro CF.

The HDMI connector 507 is used to plug into the transmission line of the HDMI connector (not shown in figures) and is electrically connected to an external display screen to provide viewing of images or photos captured by the wireless fishing monitor 10.

The receive antenna 508 is used for receiving the image or photo signal transmitted by the wireless fishing monitor 10 to allow the user to watch the fish schools eating bait status on the external mobile device or display screen of the receiving device 50.

While this disclosure has been described by means of specific embodiments, numerous modifications and variations may be made thereto by those skilled in the art without departing from the scope and spirit of this disclosure set forth in the claims.

What is claimed is:

1. A wireless fishing monitor, used for a main line to pass through to be tied with a swivel and a leader, the wireless fishing monitor comprising:
    a monitor module;
    a control circuit, electrically connected to the monitor module, at least comprising a first circuit board, a second circuit board, and an antenna, the first circuit board electrically connected to the second circuit board, the antenna electrically connected to the second circuit board;
    a power supply unit, located on one side of the second circuit board, and electrically connected to the second circuit board;
    a tube, comprising a cylinder body in a hollow cylindrical shape, the cylinder body comprising a front opening and a rear opening, the cylinder body comprising a front joint and a rear joint both in a threaded shape and disposed on an outer surface thereof, wherein the monitor module and the control circuit are installed in the cylinder body;
    a front cover, connected to the front joint on the front opening to cover the monitor module; and
    an antenna cover, fixedly connected to the rear joint on the rear opening of the cylinder body, and comprising an electrode connector, one end of the electrode connector electrically connected to the power supply unit, and another end of the electrode connector electrically connected to the second circuit board, wherein the power supply unit provides electricity to the monitor module and the control circuit,
    wherein, the monitor module comprises:
    an image-capturing camera, a supplementary light circuit board, and an adapter circuit board, the image-capturing camera and the supplementary light circuit board are electrically connected to the adapter circuit board, and the adapter circuit board is electrically connected, by a cable, to the control circuit and the power supply unit;

wherein, the first circuit board comprises a signal processing circuit or a charging circuit, and further comprises a first connector, a power switch, and an indicator light.

2. The wireless fishing monitor of claim 1, wherein, the supplementary light circuit board is disposed around the image-capturing camera, the supplementary light circuit board comprises a plurality of LEDs.

3. The wireless fishing monitor of claim 2, wherein, the image-capturing camera is a CCD camera or a CMOS camera.

4. The wireless fishing monitor of claim 1, wherein, the indicator light comprises a plurality of LEDs.

5. The wireless fishing monitor of claim 1, wherein, the second circuit board is electrically connected, by the cable, to the adapter circuit board to receive a signal from the monitor module, and the second circuit board comprises a negative electrode and a positive electrode disposed on one end thereof, and the negative electrode is electrically connected to a negative pole of the power supply unit.

6. The wireless fishing monitor of claim 5, wherein, the second circuit board comprises a signal processing circuit and a wireless signal transmitting circuit, and further comprises a second connector.

7. The wireless fishing monitor of claim 6, wherein, the first connector and the second connector are a micro USB connector, a mini USB connector, or a USB TYPE C connector, respectively.

8. The wireless fishing monitor of claim 5, wherein, the power supply unit comprises the negative pole and a positive pole, the negative pole is electrically connected to the negative electrode of the second circuit board to provide electricity to the control circuit, and the monitor module.

9. The wireless fishing monitor of claim 8, wherein, the power supply unit is a disposable battery or a rechargeable battery.

10. The wireless fishing monitor of claim 8, wherein, the cylinder body comprises at least one threading loop convexly disposed on an outer surface thereof between the front joint and the rear joint, the threading loop comprises at least one perforation, a fixture is disposed in the perforation, the fixture comprises two elastic sheets, two clamping mouths are connected to the two elastic sheets, and when the two elastic sheets are pressed inward, the two clamping mouths are opened.

11. The wireless fishing monitor of claim 10, wherein, the control circuit further comprises a support plate fixedly connected to the first circuit board, and the support plate comprises a keyhole.

12. The wireless fishing monitor of claim 11, wherein, the cylinder body comprises two ribs disposed on an inner wall thereof, the two ribs are configured to fix the control circuit, and each of the two ribs comprises a locking hole defined on a front end thereof, and the locking hole is configured to lock a support frame.

13. The wireless fishing monitor of claim 12, wherein, the cylinder body comprises a waterproof cover, a power button, and a display window disposed on the outer surface thereof, the control circuit is disposed inside of the cylinder body, the waterproof cover is disposed corresponding to the first connector, the power button is disposed corresponding to the power switch, and the display window is disposed corresponding to the indicator light.

14. The wireless fishing monitor of claim 13, further comprising the support frame, wherein the support frame comprises a fixing plate, the fixing plate comprises a plurality of through holes, and the through holes are configured for a screw to pass through to make the fixing plate be locked in the keyhole of the support plate and the locking hole of the rib of the cylinder body to fix the control circuit, the fixing plate comprises a passage, the passage is configured for the antenna to pass through.

15. The wireless fishing monitor of claim 14, wherein, the front cover comprises an open end and a closed end, the open end comprises an inner joint in the threaded shape, the inner joint and the cylinder body are connected to the front joint, the closed end comprises a transparent window.

16. The wireless fishing monitor of claim 15, wherein, the antenna cover comprises a float and a locking element adapted to sheathe the float, the float comprises a flange part disposed at an opening thereof, and the flange part is connected with the rear opening of the cylinder body, the float comprises a plurality of convex ribs in different shapes disposed inside, the electrode connector is fixedly connected to one of the convex ribs, one end of the electrode connector is electrically connected to the positive pole of the power supply unit, another end of the electrode connector is electrically connected to the positive electrode of the second circuit board to transmit the electric power to the first circuit board and the monitor module through the second circuit board.

17. The wireless fishing monitor of claim 16, wherein, the locking element comprises an opening portion defined on one end thereof and a constriction portion disposed on another end thereof, the opening portion comprises an inner joint in the threaded shape, the inner joint is connected with the rear joint of the cylinder body, the constriction portion of the locking element presses the flange part to be connected with the rear opening of the cylinder body.

18. The wireless fishing monitor of claim 1, wherein, two waterproof washers are respectively disposed around the front opening and the rear opening of the cylinder body.

* * * * *